United States Patent
Kyprios

[11] Patent Number: 5,518,350
[45] Date of Patent: May 21, 1996

[54] FLEXIBLE LICENSE PLATE MOUNTING DEVICE

[76] Inventor: Petros Kyprios, 4433 Denver Dr., Plano, Tex. 75093

[21] Appl. No.: 295,994
[22] Filed: Aug. 24, 1994
[51] Int. Cl.⁶ .............................. F16B 21/00; A41F 1/00
[52] U.S. Cl. ............................. 411/343; 411/552; 24/590
[58] Field of Search ..................................... 411/153, 154, 411/392, 343, 552, 555, 553; 24/115 G, 590

[56] References Cited

U.S. PATENT DOCUMENTS

| | | | |
|---|---|---|---|
| 1,615,698 | 1/1927 | Hartzell | 24/590 |
| 1,895,826 | 1/1933 | Trudeau | 411/552 X |
| 2,159,454 | 5/1939 | Shoup | 411/555 |
| 3,171,182 | 3/1965 | Danehy | 411/552 |
| 3,675,280 | 7/1972 | Winslade | 411/552 |

FOREIGN PATENT DOCUMENTS 2952226  7/1981  Germany ................................. 411/552

*Primary Examiner*—Neill R. Wilson
*Attorney, Agent, or Firm*—John E. Vandigriff

[57] ABSTRACT

The invention is to a flexible connector for attaching license plates to a vehicle, where the license plate is subject to being hit or moved over objects that would damage the license plate. The connection incudes a spring and plunger in a main body. The plunger has a flexible arm formed thereon which has a key end that connects to a knob. The flexible arm extends through holes in the license plate and a mounting frame and holds the license plate secured to the frame by the knob attached to the key on the flexible arm. When the license plate is hit or moved, the plunger will compress the spring allowing the flexible arm to extend out of the body and flex sufficiently to allow the license plate to move with the force striking it.

13 Claims, 5 Drawing Sheets

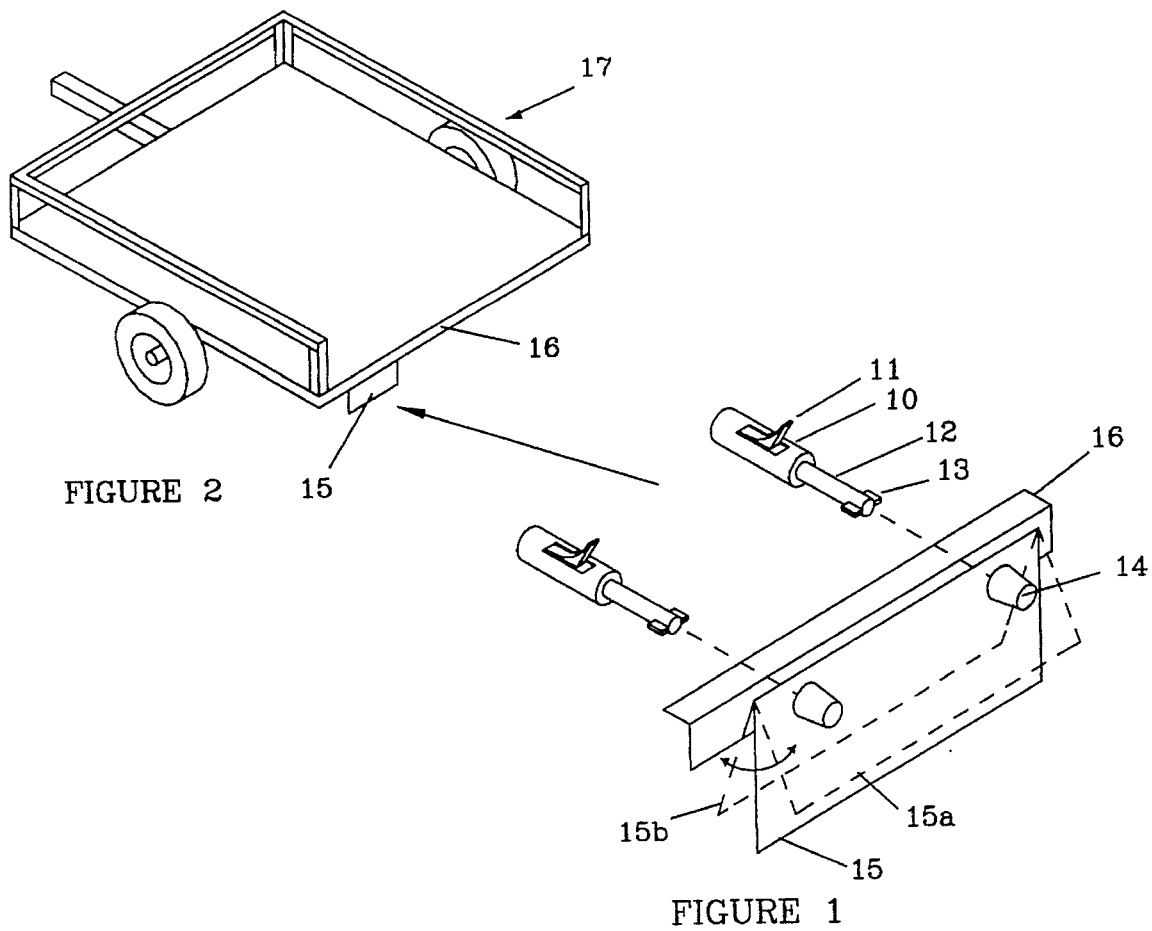

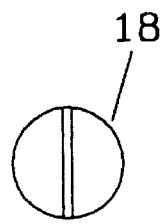 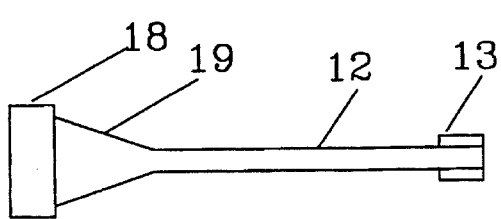 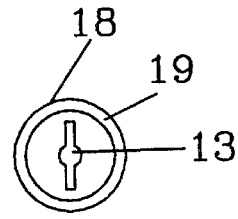
FIGURE 7a  FIGURE 7  FIGURE 7b
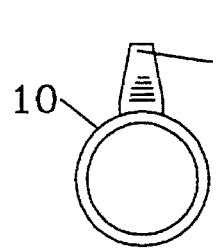 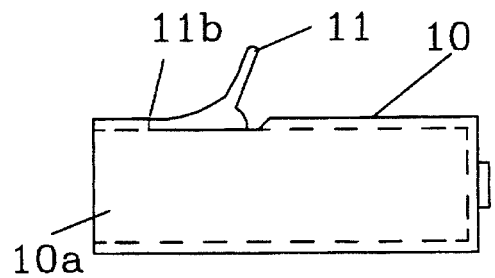 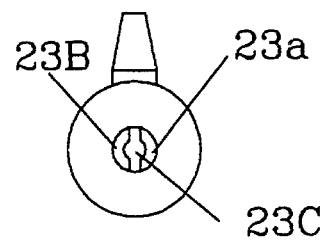
FIGURE 8a  FIGURE 8  FIGURE 8B
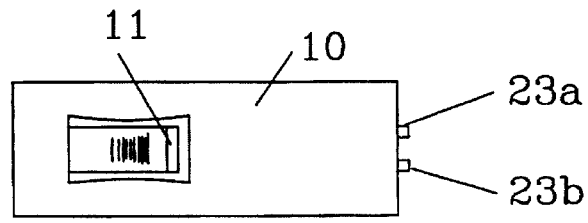
FIGURE 9

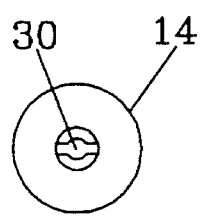 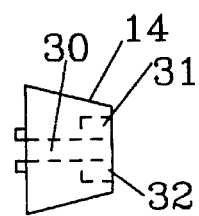 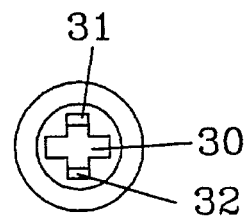
FIGURE 10a  FIGURE 10  FIGURE 10B
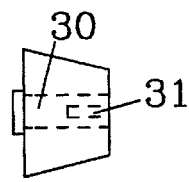
FIGURE 11
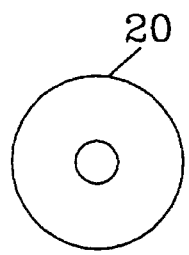 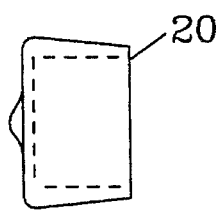 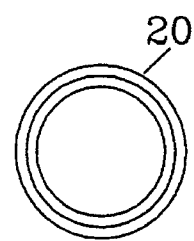
FIGURE 12a  FIGURE 12  FIGURE 12b 5,518,350

FLEXIBLE LICENSE PLATE MOUNTING DEVICE

FIELD OF THE INVENTION

The invention relates to mounting devices, and more particularly to mounting devices that secure a license plate to a vehicle allowing the license plate to swing and rotate when the license plate is stuck by rocks and debris to prevent damage to the license plate.

BACKGROUND OF THE INVENTION

On most vehicles, the mounting of the license plates is accomplished by securing the license plate to a designated area by two bolts. The designated area is usually a flat surface on a part of the bumper formed to receive a license plate. However, on trailers such as boat trailers and utility trailers, the license plate is usually attached by bolts through holes in the top of the license plate to the lower frame or to a frame on a fender below the cruising light. Because trailers are low to the ground the license plate on some trailers is only a few inches from the ground. When the trailer is taken over rough ground, debris, obstructions, over ditches, potholes, etc, or when a boat is loaded or unloaded, the license plate strikes the ground or other obstacles, bending the license plate, or tearing the license plate from its mount.

A swinging license plate bracket is defined in U.S. Pat. No. 4,413,803, in which a special bracket is secured to a support frame by a hinge device. If the license plate strikes the ground, then the license plate can swing forward or back to prevent damaging a rigidly mounted license plate.

Various other mounting brackets have been designed that pivot at one edge of the license plate, but, for the most part, these designs are for tilting the license plate away from the mounting surface as in U.S. Pat. Nos. 3,702,510 and 3,389,486.

SUMMARY OF THE INVENTION

The invention is a securing device that allows the mounted object, such as a license plate, to pivot and rotate to prevent damage to the license plate. Damage is common when small low-riding trailers traverse ground that is irregular, and is covered with debris and rocks. The "Flexbolt"™ holds the license plate stationary which driving, but allows the license plate to "flip-up" when it encounters ditches and other obstacles. The Flexbolt™ or securing device includes a body with an integrally formed latch, a spring, a plunger with a flexible arm, and a securing knob that attaches to the flexible arm. The plunger and spring are inserted into the body, with one end of the flexible arm extending out one end of the body. The flexible arm is pulled to compress the spring and the latch holds the spring in a compressed state. The flexible arm is then inserted through mounting holes in the vehicle frame and the license plate. The securing knob is then placed on the end of the flexible arm and turned to lock it onto the end of the flexible arm. The latch is then pulled to release the spring, pulling the knob and body toward each other, the body on one side of the fame and license plate and the knob on the other side of the license plated, securing the license plate to the frame. Since the arm is biased in the body by the spring, if the license plate is moved when the vehicle frame is moved toward the ground, then the license plate will pivot and not be damaged. When the license plate is moved, it pulls on the knob, pulling a part of the flexible arm out of the body. When the license plate is released, the spring will pull the flexible arm back into the body. In this manner the knob holds the license plate against the frame when the license plate is not being moved, but allows the license plate to be moved without damage to the license plate.

The technical advance represented by the invention, as well as the objects thereof, will become apparent from the following description of a preferred embodiment of the invention when considered in conjunction with the accompanying drawings, and the novel features set forth in the appended claims.

BRIEF DESCRIPTION OF THE DRAWINGS

FIG. 1 shows a license plate as mounted with the present invention;

FIG. 2 shows a trailer to which a license plate is mounted;

FIGS. 7, 7a and 7b show side and end views of the plunger;

FIGS. 8, 8a and 8b show side and end views of the body;

FIG. 9 is a top view of the body;

FIGS. 10, 10a and 10b are side and end views of the knob;

FIG. 11 is a side view of the knob rotated 90° from the side view of FIG. 10:

FIGS. 12, 12a and 12b are side, and end views of the end cap;

DESCRIPTION OF A PREFERRED EMBODIMENT

Figure 3:
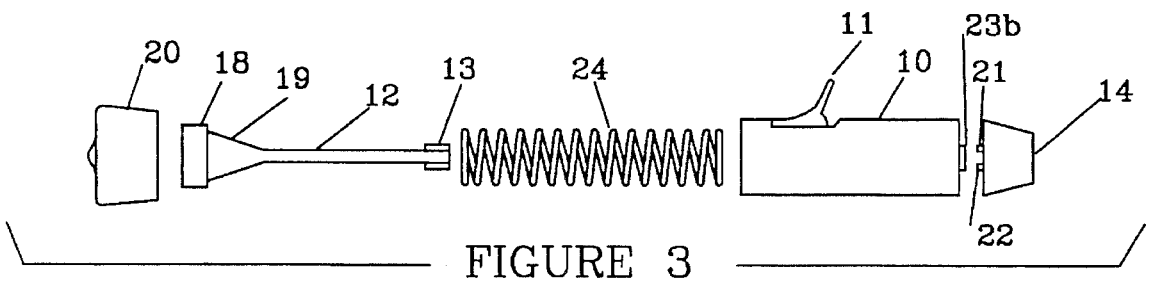
FIG. 3 is an exploded side view of the present invention.

FIG. 1 illustrates the present invention as it is used to fasten a license plate to a vehicle. Two fasteners are used to secure the license plate to a bracket or frame on a vehicle. The fastener has a body 10 with a latch 11 integrally made with body 10. A flexible arm 12 with a key end 13 is inserted through openings (not illustrated) in the frame 16 and through mounting holes in license plate 15 to secure license plate 15 to frame 16. Frame 16 is on, for example, as illustrated in FIG. 2, a utility trailer 17 where the license plate 15 is mounted close to the ground. The license plate may also be mounted on a fender below a running light. The license plate is subject to damage as the trailer tilts and is pulled over rough ground. Utilizing the flexible securing devices of the present invention, license plate 15 can swing in either direction as illustrated at 15a and 15b.

Figure 4:
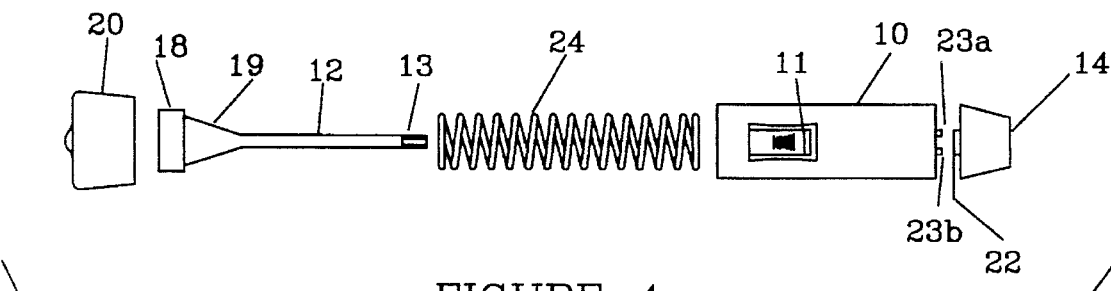
FIG. 4 is an exploded top view of the present invention.

FIGS. 3 and 4 are exploded views of the flexible fastener. FIG. 3 is a side view and FIG. 4 is a top view. FIG. 3 and 4 shown body 10 with integrally attached latch 11. Latch 11 can be pushed downward to latch spring 24 in a compressed position as described below. Plunger 18 has a tapered section 19, a flexible arm 12 and a key end 13. Cap 20 is placed over the end of body 10 after spring 24 and plunger 18 are inserted into body 10. Knob 14 is attached to key end 13 of flexible arm 12 as shown below. Body 10 has extension ridges 23a and 23b and knob 14 has extension ridges 21 and 22. These ridges extend through the mounted holes in the license plate and mounting bracket to help center the fastening device in the holes and to provide a measure of protection to flexible arm 12 from the hole edges.

Figure 5:
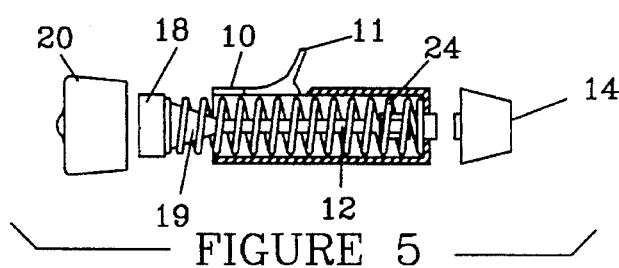
FIG. 5 is a partially assembled view of the present invention.

FIG. 5 is partially assembled view of the fastening device. Spring 24 along with flexible arm 12 have been inserted into body 10. Spring 24 slides up tapered section 19 centering spring 24 and preventing lateral movement of the spring.

Figure 6:
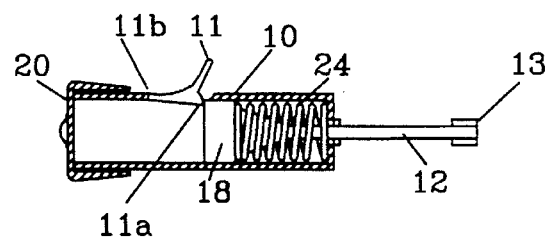
FIG. 6 is partially assembled view with the spring compressed.

In FIG. 6, flexible arm 12 has been pulled through the end of body 10, compressing spring 24. Spring 24 is held compressed by pressing latch 11 downward so that latch end 11a prevents plunger 18 from moving to the left, as illustrated in FIG. 6. End cap 20 is then placed over the end of body 10, enclosing that end.

The various parts of the fastening device are illustrated in FIG. 7–12. FIGS. 7, 7a and 7b are respectively, side, and end views of the plunger and attached flexible arm. This part is made, for example, of a nylon or nylon/co-polymer that has strength and will not break upon the bending of arm 12. Key end 13 is used to lock that end into knob 14.

FIGS. 8, 8a and 8b show respectively, side and end views of body 10. Body 10 is tubular having an opening 10 on one end and is closed on the other end, except for opening 23c through which key end 13 and flexible arm 12 extend. Opening 23c has the two raided edges 23a and 23b extending partially round opening 23c. Latch 11 is an integral part of body 10 and is flexible at 11b to permit moving key 11 up or down, to release or lock spring into a compressed state (See FIG. 6). FIG. 9 is a top view of body 10.

FIGS. 10–11 illustrates knob 14. Knob 14 has a circular cross section, and is in the shape of a truncated cone. Channel 30 extends through the knob 14 and is configured to allow key end on flexible arm 12 to pass through the channel. There are two notches, 31 and 32 in one end that do not extend completely through knob 14. Key end 13 and flexible arm 12 are inserted through channel 30 until key end 13 completely passes through and exits knob 14. Key end is then rotated 90° and pulled back into knob 14 and into notches 31 and 32. Knob 14 is then "locked" on to the end of flexible arm 12.

FIG. 12, 12a and 12b are side and end views of cap 20.

Figure 13:
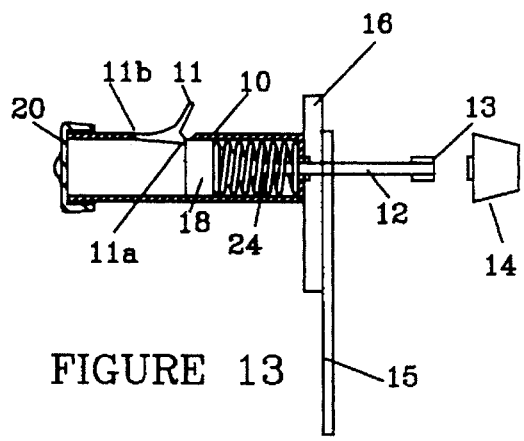
FIG. 13 shows attaching a license plate to a mounting frame.
Figure 14:
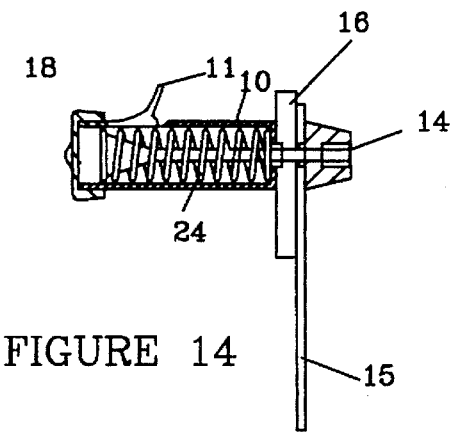
FIG. 14 shows the attached license plate.

FIG. 13 shows the attaching of a license plate 15 to a mounting frame 16. With spring 24 compressed and locked into position, flexible arm 12 is inserted through frame 16 and license plate 15. Knob 14 is placed on the end of flexible arm 12 over key end 13, and then turned 90°. After knob 14 has been locked onto the end of flexible arm 12, lever 11 is pulled up releasing plunger 18 allowing spring 24 to expand, pushing plunger 18 to the left (in FIGS. 13 and 14) pulling knob 14 against license plate 15, and securing license plate in position.

Figure 15:
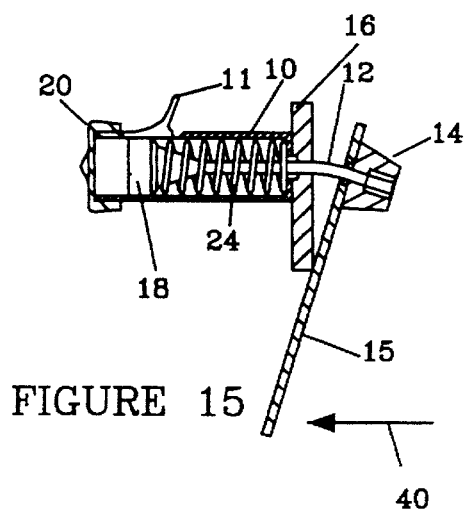
FIG. 15 shows the flexing of the attachment device by a rear force.
Figure 16:
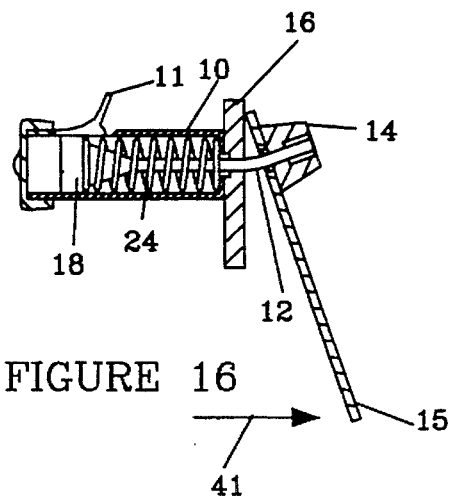
FIG. 16 shows the flexing of the attachment device by a forward force.

FIG. 15 shows that license plate 15 has been pushed to the left by a force 40 (as viewed in FIG. 15). Flexible arm 12 is pulled out of body 10 and flexed downward as the license plate is pulled against frame 16. In FIG. 16 a force 41 pushes the bottom of license plate to the right as flexible arm 12 is partially pulled out of body 10 and flexed upward. In both instances, FIG. 15 and FIG. 16, as soon as the force is removed, spring 24, pushing against plunger 18, will pull flexible arm back into body 10, pulling license plate against frame 16 in a normal position, as viewed in FIG. 14. The moving and flexing of arm 12 prevents damage to license plate 15 and secures license plate 15 to frame 16, yet allowing plate 15 to be moved without damage to the plate.

What is claimed:

1. A fastening device for flexibly mounting a license plate to a mounting frame, comprising a hollow body a plunger in said hollow body;

a spring in said hollow body with said plunger extending though said spring;

a lever in said body for holding said spring in a compressed position; and a knob removably attached to one end of said plunger.

2. The fastener device according to claim 1, wherein said plunger includes a flexible arm having a key at one end.

3. The fastener device according to claim 1, including a cap for enclosing one end of said hollow body.

4. The fastener device according to claim 1, wherein said knob has a channel extending through said knob, and two recessed areas positioned at a 90° angle to said channel.

5. The fastener device according to claim 1, wherein said plunger has tapered section and a flexible arm extending from said tapered section.

6. The fastener device according to claim 5, wherein said flexible arm has a key attached to an end opposite the end to which the flexible arm extends from said tapered section.

7. A fastening device for flexibly mounting a license plate to a mounting frame, comprising a hollow body, having a large opening in one end;

a plunger having a tapered section in said hollow body;

a spring in said hollow body with said plunger extending though said spring;

a lever in said body for holding said spring in a compressed position;

a key formed on one end of said plunger; and a knob removably attached to the key on said plunger.

8. The fastener device according to claim 7, wherein said plunger includes a flexible arm including said key at one end.

9. The fastener device according to claim 7, including a cap for enclosing the large opening in said one end of said hollow body.

10. The fastener device according to claim 7, wherein said knob has a channel extending through said knob, and two recessed areas positioned at a 90° angle to said channel.

11. The fastener device according to claim 7, wherein said plunger has tapered section and a flexible arm extending from said tapered section.

12. The fastener device according to claim 11, wherein said flexible arm has a key attached to an end opposite the end to which the flexible arm extends from said tapered section.

13. A fastening device for flexibly mounting a license plate to a mounting frame, comprising a hollow body, having a large opening in one end;

a plunger, having a tapered section and a flexible arm extending from said tapered section, in said hollow body;

a spring in said hollow body with said plunger extending though said spring;

a lever in said body for holding said spring in a compressed position;

a key formed on one end of said flexible arm; and a knob removably attached to the key on said flexible arm.

* * * * *